Jan. 31, 1967 W. WIDNER 3,301,450

TRUCK-TIRE LOADING AND CARRYING DEVICE

Filed Oct. 1, 1965

William Widner, INVENTOR.

BY

ATTORNEY.

3,301,450
TRUCK-TIRE LOADING AND CARRYING DEVICE
William Widner, Box 793, Thompson Falls, Mont. 59873
Filed Oct. 1, 1965, Ser. No. 492,103
3 Claims. (Cl. 224—42.24)

This invention relates generally to a device for carrying spare tires on vehicles and particularly to such a device designed to carry heavy truck tires and position them on the carrier with a minimum of effort.

In the trucking industry, it is oftentimes necessary for one man to physically move mounted truck tires in dealing with them, particularly in a tire changing operation. Such tires are quite heavy, commonly weighing between 200 to 300 pounds, and because of their weight and physical configuration, it is quite difficult to lift and otherwise manipulate them. Previous methods of carrying such tires on trucks have required that the tire be completely lifted and otherwise manually manipulated by the operator during placement, thus requiring great effort and strain, if in fact the operation be possible. The instant invention seeks to provide a mounting device, for carrying a tire on a vehicle, that aids the operator in placement of the tire upon the device without requiring him to lift the entire weight of the tire during the operation. In so doing, it is:

A principal object of my invention to provide a tire carrying device that aids in placement of the tire thereon by requiring the operator to lift only a part of the weight of said tire during various stages of placement.

It is a further object of my invention to provide a device of the nature aforesaid that may be universally adapted to carry any of the various mounted tires of commerce.

It is a still further object of my invention to provide a device of the nature aforesaid that may be readily mounted upon existing vehicles of commerce, especially trucks, without damaging or in any way modifying the frame member thereof.

Other and further objects of my invention will appear from the following specification, claims and appended drawings which show one embodiment of my invention.

In the drawings, wherein like numbers of reference refer to similar parts throughout:

Figure 2:
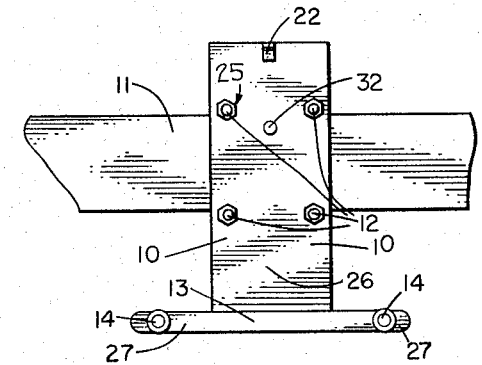
FIGURE 2 is a vertical, orthographic front view of my mounting device without the tire, to better show its parts, their relationship and configuration.
Figure 3:
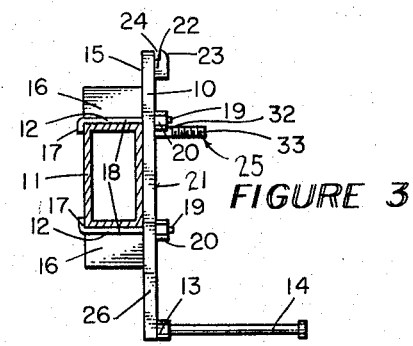
FIGURE 3 is another vertical, orthographic side view of the same invention as shown in FIGURE 2, taken on a plane rotated 90° about the vertical from that of FIGURE 2.

Referring now to the drawings in greater detail, and particularly to those of FIGURES 2 and 3, it will be seen that my invention comprises the vertical body member 10, mounted on vehicle frame 11 by J bolts 12, and carrying at its lowermost portion lower cross member 13 having horizontal supports 14 at its lateral extensions.

Body member 10 is a rectangular, planar piece of sheet steel shaped as illustrated. On its back side 15 it structurally carries rearwardly disposed chair blocks 16, adapted to fit immediately above and below vehicle frame member 11 to position body member 10 thereon. If necessary or desirable, small, flat, rectangular chair block pads (not shown) may be positioned between the adjoining surfaces of the chair blocks 16 and frame member 11 to avoid any unnecessary motion, wear or rattling.

The body member 10 is removably fastened to vehicle frame 11 by J bolts 12. These bolts are of the ordinary variety of commerce having turned legs 17, body 18, threaded end portion 19, and nut 20. The bolts are established in four appropriately positioned holes in body member 10, positioned with legs 17 fastening about vehicle frame 11, and removably established in this position by tightening the nuts 20. From this construction, it is seen that body member 10 of my invention is rigidly attached to vehicle frame 11 in a removable fashion without physically changing or damaging the vehicle frame.

Face 21 of body member 10 has, in its upper medial part, wheel rim catch 22 structurally communicating therewith and shaped as illustrated with forward-inwardly curved part 23, to aid in forcing a wheel thereover, and inward notch 24 defined thereby, adapted to maintain a mounted wheel thereon.

Fastening stud 25 structurally communicates with face 21 of body member 10, as illustrated, and is appropriately positioned thereon to project through the hub hole 31 of a wheel when it be held on the mounting device with the rim 30 of the wheel in the wheel rim catch 22.

Lowermost part 26 of body member 10 carries the laterally extending lower cross member 13, structurally joined thereto preferably by welding. This member is an elongate strip of iron of sufficient structural rigidity to support a mounted truck tire. Each end part 27 of this member structurally carries the forwardly projecting rod-like tire supports 14. These tire supports are preferably ⅞ inch bolts approximately 13 inches long and are positioned to project forwardly substantially perpendicular to the horizontal tire support 14 and vertical body member 10. These bolts are preferably structurally joined to horizontal support 14 by welding.

The positioning of wheel rim catch 22, fastening stud 25, and horizontal tire support 14, relative to each other, is critical. The positioning should be such that when the rim 30 of a mounted tire is supported by wheel rim catch 22, the fastening stud 25 will project through the central hub hole 31 of wheel 29, substantially in its central part, and the tire 28 will be positioned a very slight distance above the body of horizontal tire support 14, so that its weight will be carried by the wheel rim catch 22.

Figure 1:
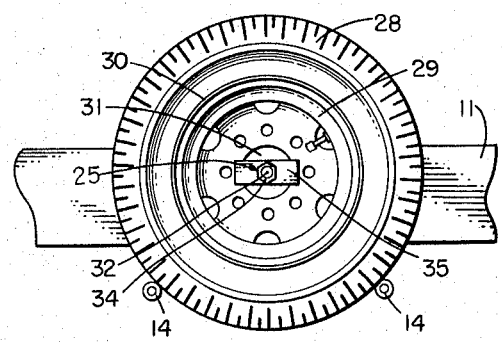
FIGURE 1 is a vertical, orthographic view of a tire in place upon my mounting device on a vehicle frame.
Figure 4:
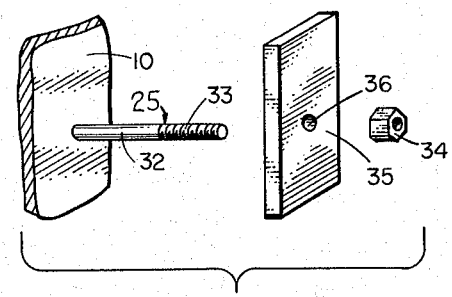
FIGURE 4 is an expanded, isometric view of the mounting lug, plate and nut of my invention, showing their relationship and configuration.

Fastening stud 25 is shown in detail in FIGURE 4. It comprises stud 32 with threaded end part 33 and nut 34 threadedly engageable thereon. Fastening cleat 35 has a central hole 36 adapted to slidably fit over the body of stud 32 and is of a size greater than the major diameter of hub hole 31 so that the cleat 35 will hold hub 29 of a mounted tire 28 against body member 10 when positioned as illustrated in FIGURE 1 with the nut 34 tightened thereagainst.

Figure 5:
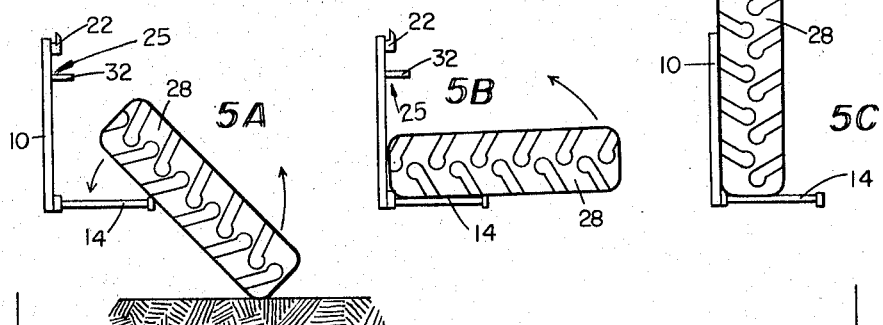
FIGURE 5 is a series of three diagrams showing a tire in relation to my invention in various positions of mounting to illustrate the mounting procedure.

The operation of my device is illustrated bestly in the diagrams of FIGURE 5. The invention is positioned on a motor vehicle, preferably on an elongate side frame member immediately rearward of the vehicle cab, by the means previously described. The device should be in such relationship with the ground that a tire resting thereon will rest substantially as illustrated in diagram 5A of FIGURE 5, with the tire rim on the ground and the wheel, near the hub hole 31, resting on the forward portion of tire supports 14. It is desired that the relationship of my invention to the ground and that the length of horizontal tire supports 14 be such as to make the communication between wheel and tire supports quite near the center of mass of the mounted tire 28, so that it may be moved with least possible effort.

With the tire in this position, the outer edge is lifted by the operator in an upwardly extending arc, as illustrated in diagram 5B, until the tire rests in the vertical position illustrated in diagram 5C of FIGURE 5. In this final position, the tire will be resting on the horizontal tire supports 14 and immediately below the wheel rim catch 22. The tire then is pushed or slammed against the wheel rim catch 22 and thereby forced onto the catch, with the peripheral rim 30 engaged therein and the tire supported thereby, resting just immediately above the horizontal tire supports 14. Fastening cleat 35 is then positioned as illustrated in FIGURE 1 and held in this position by tightening nut 35 on stud 32 thereagainst. The operation may be reversed to dismount the tire.

From the operation described it is to be noted that at no time will an operator mounting or dismounting a tire be required to exert a force as great as that of vertically lifting the same tire against gravity. It is to be further noted that the device will removably secure a tire mounted thereon in a stored position indefinitely, and may be readily operated without any unusual tools or appurtenant structures.

While the foregoing description is necessarily of a detailed, particular character so that a specific embodiment of my invention may be clearly set forth, as required by law, it is to be understood that various rearrangements of parts, multiplications thereof, and modifications of detail may be resorted to in connection with the invention without departing from its spirit, scope or essence.

Having thusly described my invention, what I desire to protect by Letters Patent, and

What I claim is:

1. A tire mounting device, having appurtenances aiding in the mounting and dismounting of tires of the nature aforesaid, comprising, in combination:
 a vertical, planar body member attachable to a vehicle frame by paired, opposed chair blocks rearwardly extending on each side of said frame and a plurality of J bolts releasably communicating between said frame member and said body member, said body member having in the upper medial portion of its face, a wheel rim catch adapted to receive and releasably hold the wheel rim of a mounted tire, and a fastening stud there below adapted to extend through the hub hole of said wheel and fasten it thereto, and
 a lower horizontally extending cross member, carried by said body, having at its lateral extensions paired, opposed horizontal extended tire supports adapted to movably receive and support said mounted tire.

2. The invention of claim 1 wherein said wheel rim catch has an outwardly sloping, rounded forward portion defining in a rearward groove adapted to receive the peripheral edge of a wheel hub, said catch being so positioned on said body member as to receive a mounted tire and support it immediately above said tire supports.

3. The invention of claim 2 releasably positioned on a vehicle frame so that the wheel mounting said tire may rest on the forwardmost projections of said tire supports at a point near the center of mass of said mounted wheel when the peripheral edge of the tire mounted thereon rests on the surface supporting said vehicle.

References Cited by the Examiner

UNITED STATES PATENTS

| 1,312,829 | 8/1919 | Brokenshire | 224—42.26 |
| 2,063,092 | 12/1936 | Groden | 214—451 |
| 2,409,395 | 10/1946 | Schwinn | 224—42.03 |
| 2,772,826 | 12/1956 | Krengel | 224—42.24 |

FOREIGN PATENTS 535,607  1/1922  France.

GERALD M. FORLENZA, *Primary Examiner.*

F. WERNER, *Assistant Examiner.*